United States Patent [19]
Hunter

[11] 3,881,877
[45] *May 6, 1975

[54] CATALYST SUPPORTING SCREEN

[75] Inventor: James B. Hunter, Newton Square, Pa.

[73] Assignee: Matthey Bishop, Inc., Malvern, Pa.

[ * ] Notice: The portion of the term of this patent subsequent to Dec. 4, 1990, has been disclaimed.

[22] Filed: Aug. 23, 1973

[21] Appl. No.: 383,103

Related U.S. Application Data
[63] Continuation-in-part of Ser. No. 186,630, Oct. 5, 1971, Pat. No. 3,776,701.

[52] U.S. Cl. .............. 23/288 R; 55/526; 423/392
[51] Int. Cl. .......................... B01j 1/00; B01j 9/04
[58] Field of Search ...... 23/288 R; 55/526; 423/392

[56] References Cited
UNITED STATES PATENTS

| 2,829,733 | 4/1958 | Bartels et al. | 55/526 |
| 3,245,206 | 4/1966 | Bonnet | 55/158 |
| 3,434,826 | 3/1969 | Holzmann | 23/288 R UX |
| 3,660,024 | 5/1972 | Gillespie | 252/477 R X |
| 3,776,701 | 12/1973 | Hunter | 23/288 R |

OTHER PUBLICATIONS

"Nitric Acid Rolls On" Chemical Engineering, Vol. 77, June 29, 1970, McGraw-Hill, N.Y., N.Y. (page 24 relied on).

Primary Examiner—Barry S. Richman
Attorney, Agent, or Firm—Cushman, Darby & Cushman

[57] ABSTRACT

A catalyst supporting structure comprising a layer of heat-resistant wire elements composed of knitted wire, placed in contiguous relationship with each other to provide a pad of substantially uniform thickness and having flat top and bottom surfaces, with a woven sheet of heat-resistant material bonded to each surface. The heat-resistant wire elements and optionally the woven sheet consist essentially of an alloy of iron, chromium and aluminum.

6 Claims, 11 Drawing Figures

PATENTED MAY 6 1975 3,881,877

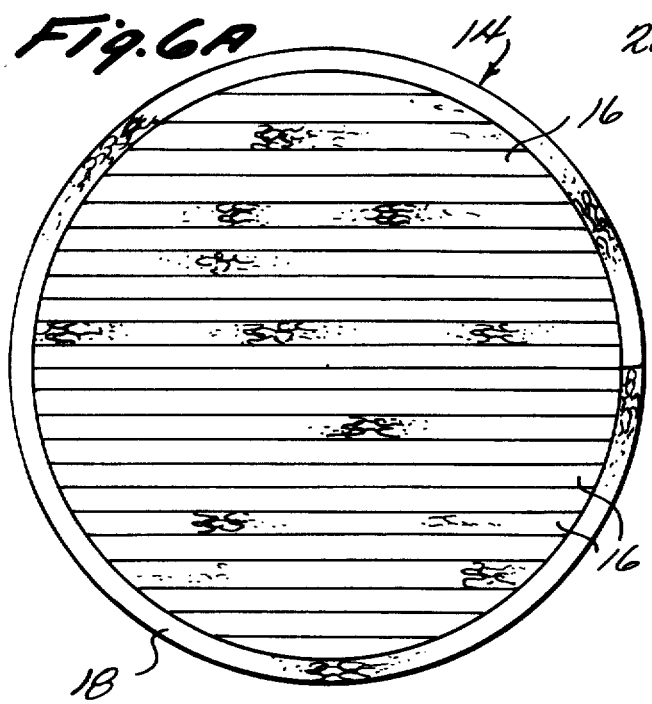
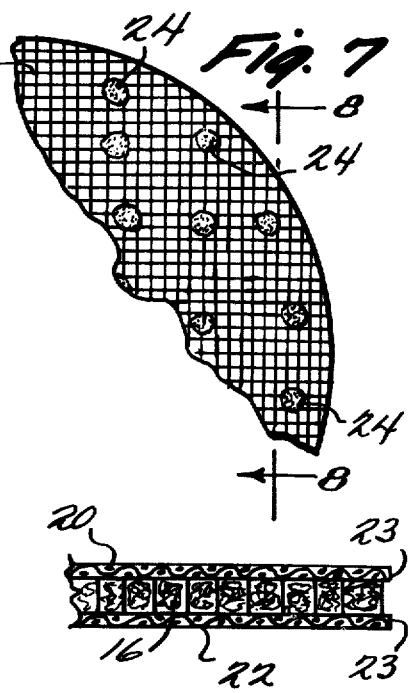
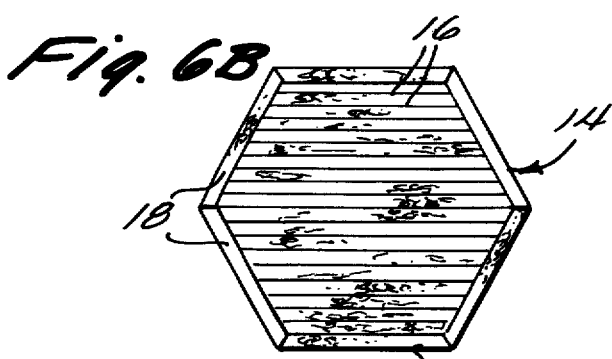
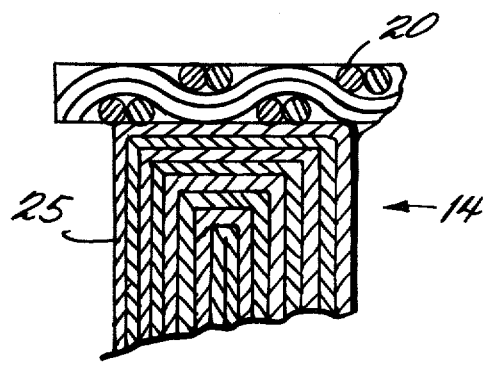
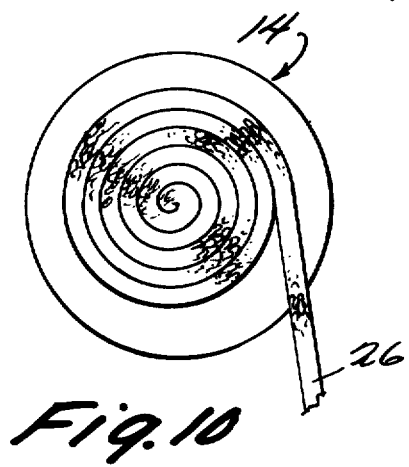

CATALYST SUPPORTING SCREEN

The present application is a continuation-in-part of Ser. No. 186,630, filed Oct. 5, 1971 now U.S. Pat. No. 3,776,701 issued Dec. 4, 1973.

The present invention relates to certain improvements in the catalyst supporting structure described and claimed in Ser. No. 186,630, the subject matter of which is incorporated herein by reference.

In numerous types of chemical processes involving a catalyzed reaction of gaseous reactants, it is desirable to support the catalyst by means which will permit gaseous reactants to pass through the catalyst and its support at elevated temperatures and pressures. For example, in the oxidation of ammonia in the preparation of nitric acid, ammonia and oxygen are passed through a platinum gauze catalyst supported on nichrome bars and heavy mesh screen (see, for example, U.S. Pat. No. 3,195,988). It has also been proposed to position getter netting or gauze between the catalyst and the support to recover platinum lost by volatilization from the platinum catalyst (see U.S. Pat. No. 3,434,826 which describes the use of one or more nettings or screens of palladium or palladium/gold alloy between platinum wire screens constituting the catalyst and a coarse metal netting as support for the catalyst and getter.

The above-mentioned Ser. No. 186,630 describes the claims a catalyst supporting structure comprising a layer of heatresistant rope elements composed of knitted wire, each of which is rolled up on itself and shaped into elements having essentially flat outer surfaces, said elements being placed in contiguous relationship with each other to provide a pad of substantially uniform thickness and having flat top and bottom surfaces and a woven foraminous sheet of heat-resistant material bonded to each surface. This structure has been found to be eminently suitable for use in, for example, ammonia oxidation processes. The present invention has as its principal object an improvement in the structure of Ser. No. 186,630 which makes it possible for the support to be used for a longer period of time. Other objects will also be hereinafter apparent.

Broadly described, the supporting structure of this invention comprises a layer of heat-resistant wire elements composed of knitted wire and positioned so that adjacent elements are in contiguous relationship with each other to provide a pad of substantially uniform thickness throughout and having flat top and bottom surfaces, and a woven sheet of heat-resistant material bonded to each flat surface of the pad. According to the invention, the wire elements consist essentially of an alloy of iron, chromium and aluminum optionally with minor amounts of cobalt, silicon and/or manganese but no nickel (or at most not more than 5 percent nickel). The wire utilized usually will have a diameter in the range of 0.005 to 0.009 inches, preferably about 0.006 to 0.008 inches, although diameter sizes outside this range may also be used.

In Ser. No. 186,630, the rope elements are disclosed as preferably being made of nichrome wire. It has been found that the nichrome wire of the diameter indicated tends to lose its integrity in use in ammonia oxidation and this may reduce the useful life of the structure. Because the structure of Ser. No. 186,630 includes a woven sheet of larger diameter wire on both sides of the rope elements which is not significantly effected by ammonia oxidation conditions, the structure of Ser. No. 186,630 maintains its integrity and can be used for long and effective periods of time even though the nichrome rope elements themselves, because of their finer wire size, may break down or lose their integrity in use. According to the present invention, however, it has been found that if the wire in the rope elements is composed of an iron/chromium/aluminum alloy, optionally containing cobalt and from 0 to 5 percent nickel, the life of the rope elements is very markedly improved thus greatly extending the period for which the structure can be effectively used.

Two particularly useful alloy compositions for the rope elements used herein are available as "Kanthal" and "Megapyr". These alloys have the following compositions, percentages being by weight:

| "Kanthal" |
|---|
| 4.5% aluminum |
| 22.0% chromium |
| .5% cobalt |
| balance, iron |

| "Megapyr" |
|---|
| 5% aluminum |
| 22–25% chromium |
| less than 1.0% silicon |
| less than 1.0% manganese |
| balance iron |

It will be recognized that the two alloy compositions described above are given only as examples. Broadly described, the alloy used herein for the rope elements, and preferably for the woven sheets as well, consist essentially of 20–30 percent chromium, 4–6 percent aluminum, balance essentially iron with the optional presence of not more than 1 percent cobalt, silicon and/or manganese. Preferably the alloy used is essentially nickel-free although, as stated above, up to 5 percent nickel can be tolerated.

It is essential, according to the invention, that the rope elements be composed of a nickel-free alloy, or one of low nickel content as described above. Preferably the woven screens are also composed of such alloy although, because of the larger diameter wire used therein, conventionally available woven nichrome screens may also be used. Typically the sheets, whether of nichrome or alloy as described above, are screens of 50 mesh or coarser (U.S. Sieve). Particularly useful results have been obtained with 10–20 mesh woven screens (e.g. 18 mesh, 0.016 inch diameter wire).

The wire rope used herein represents a particularly important feature of this invention. As indicated above, the rope comprises knitted wire tubing flattened, rolled and shaped to form a square or rectangular cross-section, preferably square. It is essential for best results that the outer surfaces of the rope be substantially flat so that when segments of the rope are arranged in contiguous relationship a pad having a substantially uniform thickness is formed. Typically the rope is such that it has cross-sectional dimensions in the range of one-eighth to one-half inch with a square cross-section of one-fourth × one-fourth inch preferred although it will be appreciated that the cross-sectional dimensions may be varied.

The wire rope referred to above may be formed into a pad for use herein in several ways, e.g. by cutting the rope into rope elements of desired length and bringing these into parallel contiguous relationship or by simply winding the rope into a flat spiral so that adjacent elements thereof are in contiguous relationship. Both of these methods start with a knitted tube of the indicated alloy wire. Tubes of this sort are known in the art (see, for example, U.S. Pat. No. 3,245,206). According to the present invention, the knitted tube is flattened, rolled into a cylindrical form and then shaped into a porous flexible flat-sided rope, preferably of relatively square cross-section. In one embodiment of the invention, the rope is cut into rope elements of appropriate length and these are placed side by side in parallel contacting relationship in a common plane to form the pad. The pad is completed by wrapping another flat sided rope element around the circumference or outer extremity defined by the parallel rope elements. The supporting structure is completed by placing one or more woven sheets on the top and bottom surfaces of the resulting pad and bonding, e.g. spot welding, these woven sheets to the rope elements at spaced intervals over the entire surface of the pad.

In the alternative fabricating method, the rope is not cut into rope elements but instead is simply wound in a spiral to give a circular pad of desired diameter followed by positioning the woven outer screens on the top and bottom of the pad and spot welding or otherwise bonding the sheets to the pad.

The invention is hereinafter described in more detail by reference to the accompanying drawings wherein:

FIG. 1 is a vertical sectional view of a catalytic reactor showing the manner in which a catalyst supporting structure according to this invention may be used;

FIGS. 2-5 diagrammatically show various phases in one method of preparing the rope elements of the present invention;

FIGS. 6A and 6B are plan views showing how the rope elements may be assembled to make a pad;

FIG. 7 is a fragmentary top plan view showing the completed supporting structure using the pad of FIG. 6A;

FIG. 8 is a fragmentary sectional veiw of the supporting structure along the lines 8-8 of FIG. 7;

FIG. 9 diagrammatically illustrates another embodiment of this invention; and

FIG. 10 diagrammatically shows an alternative method for making the rope elements used herein.

Figure 1:
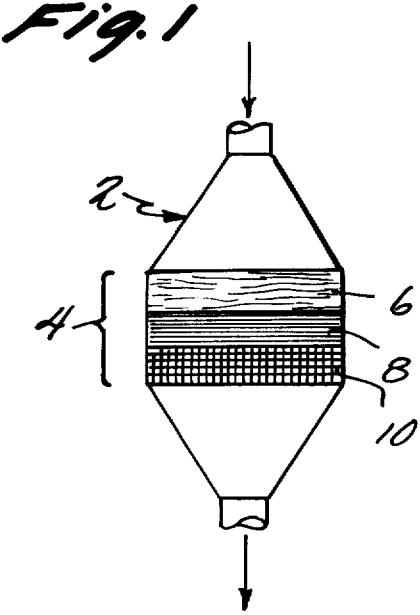

Referring more specifically to the drawings, a typical way of using a catalyst supporting structure according to this invention is shown in FIG. 1 wherein 2 represents a reactor which, for purposes of illustration, may be a conventional type ammonia oxidation burner, including a catalyst package 4, through which a gaseous mixture of $NH_3$, $O_2$ and $N_2$ is fed, at elevated temperature and pressure. The catalyst package 4 comprises a woven gauze or pack of such gauzes 6 of platinum metal, preferably platinum/rhodium alloy. Typically the gauze or gauze pack comprises woven 80 mesh screen with 90 percent platinum/10 percent rhodium alloy wire (0.003 inch) although different mesh sizes, wire compositions and the like may be used.

Preferably, but not necessarily, the catalyst package also comprises one or more screens 8 or the equivalent of a "getter" material, as described in U.S. Pat. No. 3,434,826. As shown, and as understood in the art, the getter is positioned just below the catalyst 6 and serves to collect platinum volatilized from the catalyst.

The supporting structure 10, constituting the essential aspect of the present invention, serves to support the catalyst 6 and getter 8 although it will be appreciated that in certain circumstances, the getter may be omitted. Additionally, in a further modification of the invention as described below, the getter may be made a part of the supporting structure 10.

Figure 2:
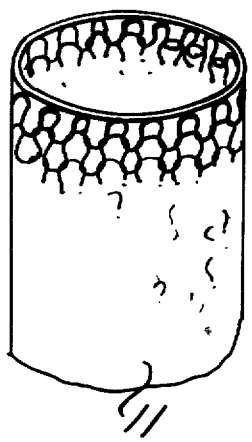
Figure 3:
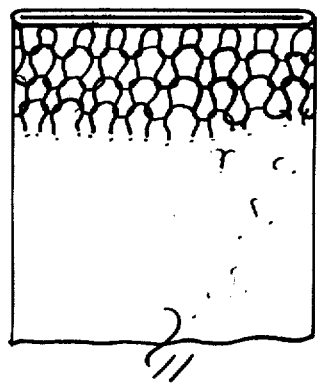
Figure 4:
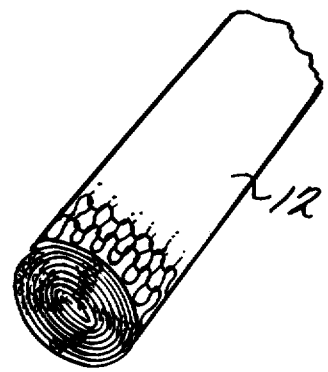
Figure 5:
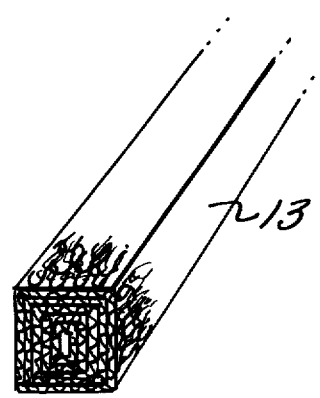

FIGS. 2-5 illustrate the steps involved in preparing the rope used for the supporting structure of this invention. The rope is formed from a tube 11 knitted of alloy wire as shown in FIG. 2. Typically, but not necessarily, the tube is knitted by feeding 0.005 inch wire of the indicated alloy composition through a knitting machine to produce a knitted tube or cylinder, it being appreciated that the size of the wire used and the diameter of the tubing can be varied as desired. The tube 11 is flattened as shown in FIG. 3 and rolled up as tightly as convenient around its longitudinal axis as in FIG. 4, to produce a cylinder 12, the latter being thereafter compacted and shaped in any convenient fashion, e.g. by drawing through a die, and calendaring to give the desired flat-sided rope 13, preferably of square cross section, as shown in FIG. 5. The compacting and shaping of the knitted tubing results in a rope wherein the various layers of wire are intermeshed and integrated with each other to give a structure which does not tend to unwind or unravel.

The density of the knitted wire rope can be varied as desired to fit the intended use. However, the rope advantageously has a volume density of about 10-30 percent, preferably 10-20 percent (i.e. the degree of compacting is such that the rope comprises 10-30 percent or 10-20 percent metal, balance void). As noted earlier herein, the rope may be from one-eighth – one-half inch in cross-sectional dimension, preferably one-fourth inch square.

The pad 14, see FIGS. 6A and 6B particularly, is made by cutting the rope 13 into rope elements or pieces 16 of appropriate length to form the desired shape when the pieces are brought together in parallel contiguous relationship, preferably circular or hexagonal as shown in the embodiments illustrated in FIGS. 6A and B. One or more pieces 18 of the rope 13 are then placed around the abutting pieces 16 as shown in FIGS. 6A and 6B. Woven sheets 20 and 22 of wire, preferably of an alloy composition as described earlier herein, are positioned on the top and bottom surfaces of the resulting pad 14, as shown in FIGS. 7 and 8, and spot welded on a grid pattern as shown at 24 (FIG. 7) to the encompassing rope piece or pieces 18 and to the elements 16 to complete the supporting structure. The sheets 20 and 22 extend outwardly over piece 18 as shown by the numeral 23 in FIG. 8 and serve to firmly hold the piece or pieces 18 and encircled elements 16 in place to give a compact unitary structure which is adapted for easy installation in conventional type ammonia oxidation reactors such as shown in FIG. 1, or the like, to provide a firm, controlled density base or support for the catalytic gauze.

In a further modification of the invention, the tube 11 used to make the wire rope 13 is knitted with a combination of the alloy wire and palladium or palladium/gold wire, e.g. the wires are plied together or otherwise combined so as to provide a catalyst support which includes the getter material as an integral part of the support itself rather than as a separate layer. This makes it possible to eliminate the use of the separate getter layer 8 shown in FIG. 1. FIG. 9 illustrates this embodiment of the invention, the numeral 25 representing the getter wire intermixed with the alloy wire in the pad 14. It will be recognized that the amount of getter in the pad may be varied but, as an illustration, a ratio of palladium/gold alloy to alloy wire of from 1:1 to 1:3 may be mentioned with best results obtainable at a 1:2 ratio. In lieu of the method described above for fabricating the pad 14, an alternative method is shown in FIG. 10. This method replaces the steps of cutting the rope into lengths 16 and encircling the same with rope 18 as in FIGS. 6A and 6B and involves using a continuous length 26 of the rope 13 and simply winding the rope on itself to provide the pad 14, the support being completed as in the FIG. 6A by placing the woven sheets 20 and 22 on both sides of the pad and welding as in FIG. 7.

While the invention has been described above with particular reference to use of a structure to support catalysts comprising platinum, e.g. platinum/rhodium alloys, for oxidation of ammonia in the production of nitric acid, it will be recognized that the structure may be used in other types of reactions, such as the Andrussow hydrocyanic acid synthesis, using the same or different catalysts. The structure may also be used as a demister and for other purposes obvious to one in the art.

Various other modifications will also be apparent, the scope of the invention being defined in the following claims wherein

What is claimed is:

1. A catalyst supporting structure comprising a pad of heat-resistant wire elements wherein the wire elements are composed of knitted wire, said elements being placed in lateral contacting relationship with each other to provide a pad of substantially uniform thickness and having flat top and bottom surfaces and a woven sheet of heat-resistant material, in addition to said heat-resistant wire elements, positioned directly on the top and bottom surfaces of said pad, said wire being composed of an alloy consisting essentially of aluminum, chromium and iron.

2. The structure of claim 1 wherein the woven sheets are also composed of an alloy consisting essentially of aluminum, chromium and iron.

3. A catalyst supporting structure according to claim 1 wherein the wire elements are rolled and shaped into rope elements having flat sides.

4. A catalyst supporting structure according to claim 1 wherein the wire elements are essentially square in cross-section.

5. A catalyst supporting structure according to claim 1 and comprising said wire elements arranged in parallel in a common plane and of varying lengths so as to form said pad, another such element or elements peripherally encompassing said pad to enclose the elements arranged in parallel, and woven sheets of heat-resistant material on the top and bottom of said pad, said sheets being bonded to the pad at spaced intervals.

6. A catalyst supporting structure according to claim 1 wherein the wire elements are composed of an alloy consisting essentially of 20–30 percent chromium, 4–6 percent aluminum, the balance being iron.

* * * * *